United States Patent [19]

Beaudoin et al.

[11] 3,962,927

[45] June 15, 1976

[54] VARIABLE DIAMETER PULLEY WITH IMPROVED PUSHER RING

[76] Inventors: Guy Beaudoin, 1238 Chabanel St., Drummondville South, Quebec; Marcel Vincent, 320 Hebert St., Wickham, Quebec, both of Canada

[22] Filed: Jan. 14, 1975

[21] Appl. No.: 541,069

[52] U.S. Cl............................................. 74/230.17 E
[51] Int. Cl.²................................................ F16H 55/52
[58] Field of Search ............ 74/230.17 E, 230.17 R, 74/230.17 A, 230.17 B, 230.17 M, 217 CV, 336

[56] References Cited
UNITED STATES PATENTS 3,665,781    5/1972    Kawamura .................. 74/230.17 E
3,768,323    10/1973   Houle ........................... 74/230.17 E Primary Examiner—Samuel Scott
Assistant Examiner—A. Russell Burke

[57] ABSTRACT

A variable diameter pulley including a pair of pulley flanges axially displaceable one relative to the other, centrifugally responsive weights acting on one flange to cause axial displacement thereof, a pusher ring interposed between the actuating weights and the axially displaceable flange, a drive device transmitting the rotation to the weights and the axially displaceable pulley flange. This variable diameter pulley is characterized by providing the pusher ring with opposite faces of dissimilar radial contours to selectively set the ring for engagement of the weights with a selected one of the contours and thus obtain a corresponding rate of axial action in the displaceable pulley flange.

1 Claim, 4 Drawing Figures

VARIABLE DIAMETER PULLEY WITH IMPROVED PUSHER RING

This invention relates to a pulley of the type having a pair of pulley flanges adapted to be axially moved toward and away one from the other to vary the effective engagement of a belt therewith. A pulley of this type finds particular application in a snowmobile.

The anteriorly proposed pulleys of the above type reveal that other desiderata concerning the operation of such pulleys have not been met and that further functional and structural advantages may be imparted to such pulleys. In particular, these heretofore proposed pulleys have an abutment face forming part of the displaceable pulley flange and having a straight line radial contour. Thus, the abutment face of the prior art has a single radial contour and is not adapted to be changed.

It is a general object of the present invention to provide a variable diameter pulley with centrifugally responsive weights, an axially displaceable pulley flange, and means to selectively set the rate of axial action of the weights on this axially displaceable pulley flange.

It is a more specific object of the present invention to provide, in a variable diameter pulley which includes centrifugally movable weights or levers, a pusher ring intermediate the latter and the axially displaceable flange, which pusher ring is readily replaceable and which includes radially opposite faces of dissimilar radial contours and is selectively reversible for engagement of the weights with a selected one of these radial contours and corresponding setting of the rate of axial action of the weights on the displaceable pulley flange.

The above and other objects and advantages of the present invention will be better understood by the following description of a preferred embodiment thereof which is illustrated, by way of example, in the accompanying drawings, wherein.

Figure 1:
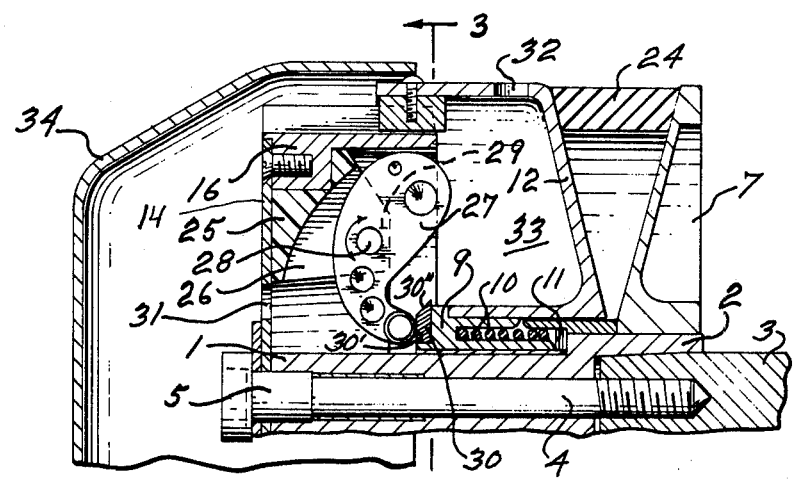
FIG. 1 is an axial cross-sectional view through a variable diameter pulley shown in fully actuated position according to the present invention.

The illustrated variable diameter pulley includes a shaft 1 having an axially bored end 2 engaging on the end of a driving shaft 3. The pulley shaft 2 is fixed to the driving shaft 3 by a bolt 4 extending through a bushing 5. The axially bored end 2 is of larger diameter than the remainder of the pulley shaft and forms an annular shoulder 6 constituting an axial abutment or stop, the function of which will be better defined later.

A pulley flange 7 is rigidly fixed on the bored end 2 for rotation with the pulley shaft 1 and in axially fixed position relative to the latter. A sleeve 8 is also rigidly fixed on the bored end 2 and projects axially away from the pulley flange 7. Another sleeve 9 is rotatably and slidably mounted on the pulley shaft 1. The sleeves 8 and 9 cooperatively form an annular space with each other in which is contained a compression spring 10. Shims 11 are positioned against the annular shoulder or stop 6 with the spring 10 in abutment therewith. As seen in FIG. 1, the shims 11, in cooperation with the axial stop 6, limit the axial displacement of the sleeve 9 relative to the fixed pulley flange 7, such as to maintain a clearance between the axially displaceable pulley flange 12 and the fixed flange 7. The pulley flange 12 is fixed to the sleeve 9 for bodily axial and rotational displacement therewith. The axially displaceable flange 12 is formed with a cylindrical skirt portion 13 at the periphery thereof.

A circular drive plate 14 is clamped against the end of the pulley shaft 1 by the bolt 4 and the washer 15. A sleeve 16 is secured peripherally to the drive plate 14 by screws 17, or other suitable expedient, and projects toward the pulley flanges 7 and 12. Thus, the cylindrical skirt portion 13 circumscribes the sleeve 16 in radially spaced-apart relationship. The sleeve 16 is formed with ridges 18 and 19 against the external cylindrical surface thereof. These ridges 18 and 19 project longitudinally of the axis of the pulley. In particular, the ridges 18 extend parallel to the axis of the pulley and thus form similarly projecting grooves or guideways 20. The ridges 19, instead, extend at an angle to the axis of the pulley and form similarly projecting grooves or guideways 21. Thus, the grooves 21 extend at an angle or diagonally relative to the grooves 20 and alternate with the latter. A follower block or pad 22 is selectively engaged in each groove 20 or 21. It must be noted that the blocks 22 are pivotally mounted against the inner face of the cylindrical skirt 13, by rivets 23, to thereby allow selective engagement in the grooves 20 or 21.

The drive plate 14 and sleeve 16 thus drive the pulley flange 12 at the periphery thereof and the required clearances of the blocks 22 in the grooves produce less vibration and noise than the conventional splined drive, since the same clearances are further from the rotation axis and thence reduce the possible angular play. Preferably, the blocks or pads 22 are made of nylon, plastic, rubber or the like, which further enhances the reduction of noise.

When the blocks 22 are selectively engaged in the diagonal grooves 21, the angle of the latter being appropriately chosen relative to the direction of rotation, upon starting the rotation, the diagonal grooves 21 induce a recessive axial action on the blocks 22 and, consequently, on the axially displaceable flange 12. Consequently, there results a delayed and, thereafter, more energetic drive of the belt 24.

A carrier 25, made of a block of plastic or the like, is mounted against the circular plate 14 inside the sleeve 16. This carrier 25 is in frictionally rotative engagement with the face of the circular plate 14, such as to be driven by the latter but after some angular shifting of the carrier relative to the circular plate. The carrier 25 is formed with four radial slots 26, each having a centrifugally responsive weight or lever 27 pivoted therein by a pin 28 engaged in a corresponding open notch 29. The weights 27 may thus be readily inserted in the notches 29, which are axially projecting relative to the axis of the pulley.

A pusher ring 30, of wear-resistant material, is removably engaged on the sleeve 9 for rotation therewith. The pusher ring 30 has opposite sides or faces made with dissimilar radial contours; in this case, a completely straight line contour on one face and a broken line contour on the other face defining inner face 30' and outer bevelled face 30'' respectively. The pusher ring 30 is engaged by the weights 27, the pivotal movement of which produces the axial displacement of the ring and the displaceable flange 12.

As aforementioned, the carrier 25 is angularly shifted due to inertia relative to the drive plate 14 and, consequently, also relative to the pusher ring 30. Thus, the points of contact of the weights 27 with the ring 30 are similarly angularly varied, resulting in more even wear of the pusher ring 30 and longer life of the latter.

Figure 2:
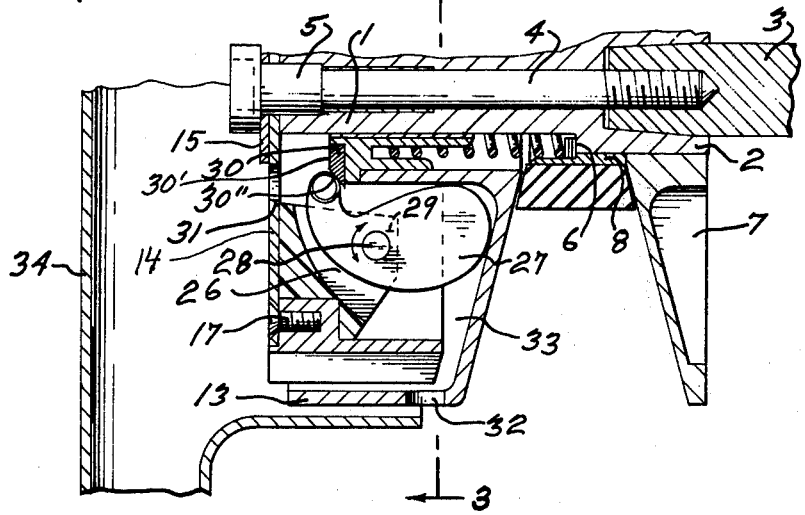
FIG. 2 is a view as in FIG. 1 but with the pulley fully de-actuated or in the idle position.
Figure 3:
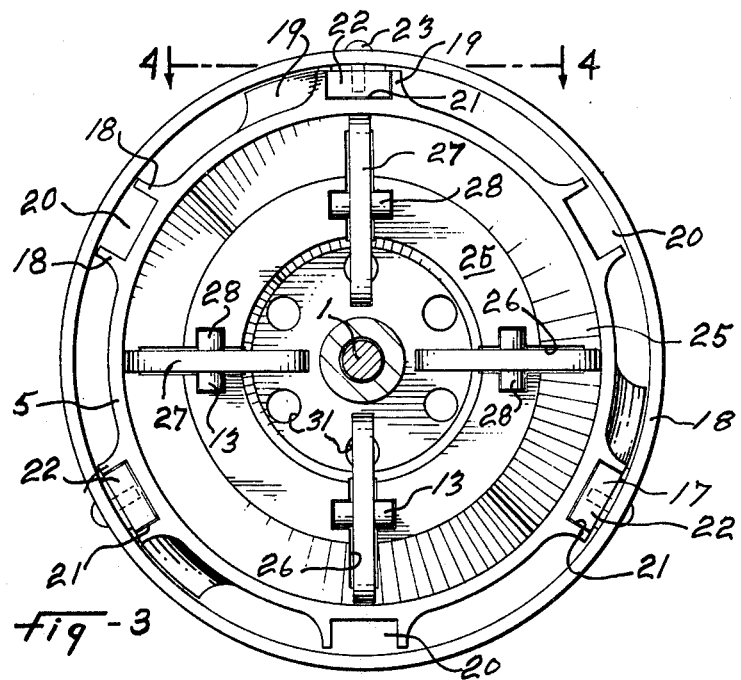
FIG. 3 is a cross-sectional view as seen along line 3—3 in FIG 1.
Figure 4:
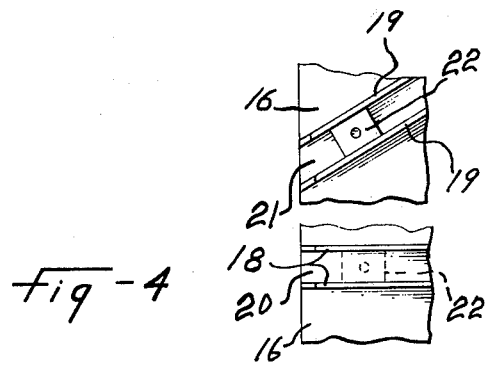
FIG. 4 is a developed plan view of portions of the drive device for the displaceable pulley flange.

The pusher ring 30 may be reversed to selectively present one of the two radially contoured faces to the weights 27. For normal operation, the completely flat face is presented. When the opposite face is presented, as shown in the drawings, the inner end of weights 27 engage bevelled face 30" in the rest position of the pulley, as shown in FIG. 2. With increase in pulley speed, the inner end of weights 27 has to move up to bevelled face 30" to engage the perpendicular face portion 30'; thus, clutching takes place at a higher speed than normally. In the fully closed position of the pulley flanges, as shown in FIG. 1, the weight inner end still engages perpendicular face portion 30'. The angle of bevelled face portion 30" may vary between about ½° and 90° with respect to face portion 30'. The greater the angle, the higher will be the speed at which clutching takes place. The rate of axial response of the displaceable pulley flange 12 may thus be preset according to the need.

The circular plate 14 is provided with air inlet ports or apertures 31, while the skirt 13 of the displaceable flange is provided with air outlet ports or apertures 32 arranged radially outwardly of the inlet ports 31. The drive device formed of the drive plate 14, the sleeve 16 and the carrier 25 forms an annular space 33 with the displaceable flange 12. This arrangement causes the flat weights 27 to act as vanes producing radially outward ventilation by air intake through the inlet ports 31, air flow in the annular space 33 and air exit through the outlet ports 32. This air flow cools the pulley itself and, in a snowmobile, is taken from outside the engine hood by a duct 34 and is circulated inside this hood to cool the engine and other driven parts. This is important, since it permits to close the hood to reduce noise while allowing proper cooling of the engine.

The shims 11 may be removed in relation to the wear of the belt 24, such that the pulley retains the same performance characteristics during the life of the belt.

We claim:

1. A variable diameter pulley comprising an output shaft, first and second conical pulley flanges coaxially mounted on said shaft, a V-belt trained between said two pulley flanges, said first pulley flange secured to said shaft, said second pulley flange axially displaceable on said shaft between a closed position in clutching engagement with said V-belt and an open position releasing and declutching said V-belt, said second pulley flange having a coaxial sleeve extending therefrom away from said first pulley flange, a compression coil spring surrounding said shaft and interposed between said two pulley flanges to urge the second pulley flange to V-belt declutching position, a pusher ring coaxially carried by the outer end of said sleeve and having an exposed surface facing away from said first pulley flange, said exposed surface including a radially inner flat face portion perpendicular to said shaft, followed by a radially outer bevelled, frusto-conical face portion, a support secured to said shaft and centrifugally responsive lever members pivoted on said support intermediate their ends and having radially inner ends engaging the exposed surface of said pusher ring for exerting an axial force thereon in a direction to move said second flange towards V-belt clutching position against the action of said spring, the inner ends of said lever members, during their centrifugally induced progressive pivotal movement, first contacting said bevelled frusto-conical face portion to displace said second pulley flange towards clutching engagement with said V-belt without clutching the same and then contacting said flat face portion to effect clutching engagement with said V-belt.

* * * * *